United States Patent
Schähl et al.

(10) Patent No.: US 6,447,631 B1
(45) Date of Patent: Sep. 10, 2002

(54) METHOD OF JOINING RAIL VEHICLE COMPONENTS AND SUBASSEMBLIES BY ADHESION

(75) Inventors: Wolfgang Schähl, Hennigsdorf; Peter Weichelt, Schönwalde, both of (DE)

(73) Assignee: ABB Daimler-Benz Transportation (DE)

( * ) Notice: Subject to any disclaimer, the term of this patent is extended or adjusted under 35 U.S.C. 154(b) by 0 days.

(21) Appl. No.: 09/194,526

(22) PCT Filed: May 28, 1996

(86) PCT No.: PCT/DE96/01004
§ 371 (c)(1),
(2), (4) Date: Jun. 28, 1999

(87) PCT Pub. No.: WO97/45308
PCT Pub. Date: Dec. 4, 1997

(51) Int. Cl.[7] .............................. B29C 65/00; C09J 5/04; C09J 9/00
(52) U.S. Cl. .................. 156/304.1; 156/295; 156/304.5; 156/310; 156/314
(58) Field of Search ............................... 156/304.5, 310, 156/312, 315, 304.1, 314, 304.2, 308.2, 308.4, 308.6, 308.8, 295

(56) References Cited

U.S. PATENT DOCUMENTS

| | | | | |
|---|---|---|---|---|
| 3,385,744 A | * | 5/1968 | Sciver | 156/310 |
| 4,051,286 A | * | 9/1977 | Abbott | 428/77 |
| 4,070,225 A | * | 1/1978 | Batdorf | 156/330 |
| 4,826,239 A | * | 5/1989 | Nishikawa et al. | 296/218 |
| 4,844,959 A | * | 7/1989 | Read et al. | 428/34.9 |
| 5,568,713 A | * | 10/1996 | Gagne et al. | 156/314 |
| 6,325,886 B1 | * | 12/2001 | Harris et al. | 156/314 |

FOREIGN PATENT DOCUMENTS

| | | |
|---|---|---|
| DE | 1 755 319 | 12/1971 |
| DE | 241 768 A1 | 12/1986 |
| DE | 35 25 830 A1 | 1/1987 |
| DE | 44 31 991 | 3/1996 |
| EP | 0 433 513 A1 | 6/1991 |
| GB | 1520873 | * 8/1978 |

* cited by examiner

Primary Examiner—Richard Crispino
Assistant Examiner—Sue A. Purvis
(74) Attorney, Agent, or Firm—McGlew and Tuttle, P.C.

(57) ABSTRACT

A process for joining components and assembly units of rail-borne vehicles by bonding is described, in which the use of an adhesive, which produces fatigue strength but cures more slowly, is combined with the use of an adhesive that ensures sufficient strength for handling in a short time, wherein complicated design of the bonded joints as well as the need for a large amount of devices are to be avoided, manufacturing tolerances are to be equalized, and defined minimum bonded gap widths are to be maintained. Furthermore, the wetting by the adhesive shall be limited to selected joining surfaces, without having to remove and dispose of the edge limitation. This object is accomplished by applying a quick-bonding first adhesive layer having an intrinsic dimensional stability to first joining surfaces and a more slowly curing second adhesive layer to second joining surfaces and by joining the components before or after the application of the second adhesive layer, wherein the first adhesive layer rapidly ensures sufficient strength for handling and maintains a predetermining joining space, while the second adhesive layer fills out the joining space set and ensures fatigue strength after its curing. The adhesive used for the first adhesive layer is also used as a permanent edge limitation.

18 Claims, 4 Drawing Sheets

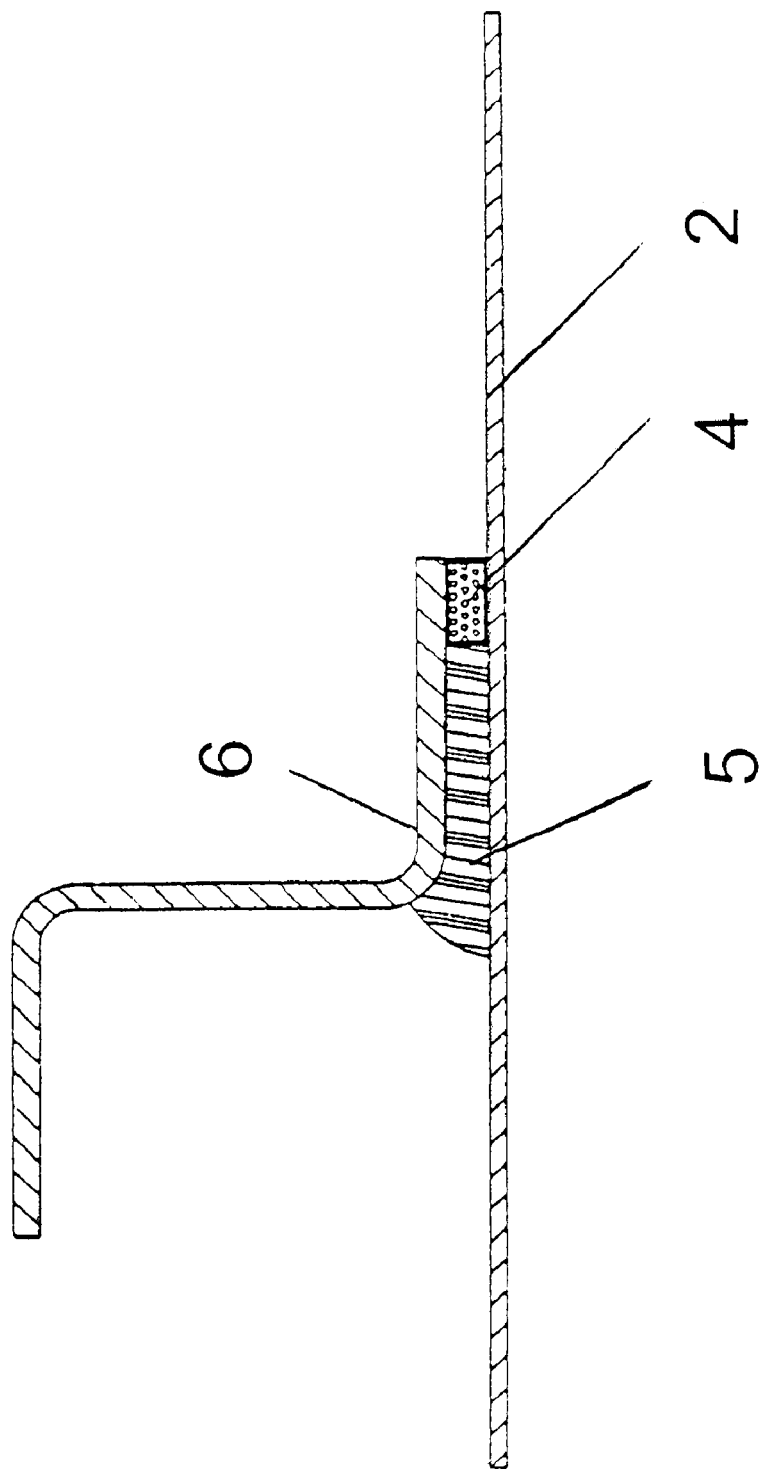

METHOD OF JOINING RAIL VEHICLE COMPONENTS AND SUBASSEMBLIES BY ADHESION

FIELD OF THE INVENTION

The present invention pertains to a process for joining components and assembly units of rail-borne vehicles.

BACKGROUND OF THE INVENTION

Attempts have been increasingly made in manufacturing rail-borne vehicles to replace complex, stress-transmitting nonpositive and positive welded, riveted or screw connections with equivalent bonded connections. It has been known that bonded assembly units can achieve fatigue strengths specific of rail-borne vehicles with one-component or two-component polyurethane adhesives. One essential drawback of the use of such adhesives is that they require a certain gap width and need defined curing times before they reach a strength that allows handling, transportation and further machining of the assembly units, so that long fixing times with maintenance of a defined joining pressure must be maintained. Adhesives that make possible very short fixing times, such as acrylate adhesives, are, in contrast, frequently not resistant to aging and cannot ensure uniform fatigue strength properties.

To reduce the technological fixing times, it is proposed in DE 35 25 830 A1 that thin-walled body parts be joined by bonding by applying a more slowly curing and permanently load-bearing principal adhesive (e.g., a strip-like strand of a two-component adhesive) to one of the elements, by subsequently bringing together the elements to be joined and joining them under pressure and subsequently applying a quick-curing adhesive (e.g., a quick-curing one-component adhesive based on cyanoacryl) in areas of the bonded joint adjacent to the principal adhesive under joining pressure between the elements, wherein the quick-curing adhesive can assume the function of the prior-art bonding device after a relatively short time. To make it possible to maintain the necessary bonding gap widths, the components to be joined are shaped in a trough-shaped or groove-shaped manner in the area of the bonded joint. In the first exemplary embodiment, the quick-curing adhesive is injected between the components through openings in one of the components. The device intended for the application of the quick-curing adhesive and the application of the necessary joining pressure is complicated; one device is necessary for each site of application or a subsequent positioning of the elements in the case of the application example described. In the second case of application, the quick-curing adhesive is applied, e.g., in troughs of one of the elements by means of glass ampules or film bags, which are destroyed during the joining process. This process cannot be used for cases of application in which components with manufacturing tolerances in relation to one another are to be joined without specially shaped bonded joints with defined layer thicknesses. Such an assembly unit obtains a decorative surface only by a subsequent equalization of the surface and surface coating.

To maintain certain bonded joint gaps, the bonding process described in EP 0 433 513 A1 provides for calibrated limiting and spacing elements in the edge area or within the bonded joint.

In DD 241 768 A1, defined points or areas of the bonded joint are provided with material elevations or applications of the same substance.

If parts with manufacturing tolerances must be joined, the latter two methods fail; moreover, in the case of a given surface, such inclusions interrupting the bonded joint and the means rigidly spacing the components to be joined from one another may reduce the bonding strength that can be theoretically reached with the given adhesive or may make it compulsory to provide much larger joining surfaces than theoretically necessary.

Moreover, the use of adhesives frequently leads to the problem that adhesive residues spreading beyond the surface area intended as a joining surface can be removed with a great mechanical or chemical effort only, which may lead to damage to the component. For example, adhesive tapes are therefore usually used as an edge limitation of the joining surfaces, and these adhesive tapes can then be separated from the surface. Their application and subsequent removal require a great effort; they usually must be disposed of as special waste.

SUMMARY AND OBJECTS OF THE INVENTION

The primary object of the present invention is to provide a novel process for joining assembly units of rail-borne vehicles by means of bonding, in which the application of an adhesive, which ensures fatigue strength and requires a relatively long curing time, is combined with the application of an adhesive that ensures a strength sufficient for handling in a short time, wherein complicated shaping of the bonded joints as well as great efforts in terms of devices are to be avoided, manufacturing tolerances between the components to be joined are to be equalized and defined minimum bonded joint gaps between the components are to be maintained, without strength-reducing disturbances occurring within the bonded joint. Another object of the present invention is to make it possible to limit the wetting of the surfaces of components with adhesive to selected joining surfaces and to avoid the subsequent removal of a covering edge limitation and its disposal as special waste.

According to the invention, a process is provided for joining components of rail-borne vehicles by bonding, in which a preformed first component is joined to a shape-adapted second component by means of the two-dimensionally separate application of adhesives with different reaction characteristics until a strength sufficient for handling is reached. The process includes bringing a first component into the position for joining and fixing in the form of use in the usual manner. A first adhesive layer having the property of being quick-bonding and maintaining a defined joining layer thickness is applied to selected and two-dimensionally limited first joining surfaces of the first component and/or of the second component. A defined amount of a second adhesive layer having the property of curing more slowly and flowing slowly during joining, but being flowable and capable of wetting, is applied to selected second joining surfaces of the first component and/or of the second component. The two components to be joined are positioned in the desired three-dimensional arrangement in relation to one another, are brought close to one another and are joined to one another under the effect of a joining pressure applied in the area of said selected first joining surfaces. The first adhesive layer connects the first component to the second component in the area of the first joining surfaces at a joining space predetermined by the defined joining layer thickness of the first adhesive layer with such a first joining strength that removal and moving of the pre-joined assembly unit is possible after the joining process without any change in the shape and position of the components. The second adhesive layer, whose amount as well as flowability and wetting ability are such that the first adhesive layer applied can contact the other component in the area of the joining surfaces, fills out the joining space left between the first and second components in the area of the second joining surfaces the assembly unit subsequently remains in its joined position or is brought into a resting position or is included in the further technological process, where a second joining strength brought about by the curing of the second adhesive layer is reached.

According to another aspect of the invention, another process for joining components of rail-borne vehicles is provided. The first component is brought into the position for joining and fixed in the form of use in the usual manner. An adhesive layer, having the property of being quick-bonding and maintaining a defined joining layer thickness during joining, is applied to said selected and two-dimensionally limited first joining surfaces of the first component and/or of the second component. The two components to be joined are positioned in the desired three-dimensional arrangement in relation to one another, are brought close to one another and are joined together under the effect of a joining pressure applied in the area of the said selected first joining surfaces. The first adhesive layer connects the first component in the area of the joining surfaces at a joining space predetermined by the defined joining layer thickness of the first adhesive layer with such a first joining strength that removal and moving of the pre-joined assembly unit is possible without any change in the shape and position of the components in relation to one another. A defined amount of a second adhesive layer having the required flowability and wetting ability is introduced into the joining space left between the first and second components in the area of selected second joining surfaces. The assembly unit subsequently remains in its joined position or is brought into a resting position or is included in the further technological process, where a second joining strength brought about by the curing of the second adhesive layer is reached.

With each of the above processes, the first joining surfaces provided may be selected such that at least part of the second joining surfaces provided is limited by parts of the first adhesive layer and undesired wetting of additional surfaces of the component by the adhesive of the said second adhesive layer is prevented.

A contact-adhesive adhesive may be used for the first adhesive layer. Intrinsically dimensionally stable adhesive bodies may be used for the first adhesive layer. A reactive adhesive may be used for the second adhesive layer. An adhesive that has the same elasticity as or a higher elasticity than the adhesive for the second adhesive layer after the final curing of this second adhesive layer may be used for the first adhesive layer.

A plurality of first and second joining surfaces may be arranged alternatingly adjacent to one another in a joined connection such that the joined connection acquires increased safety against failure. Differences in the shape and size of the components to be joined (e.g. a side wall sheet metal section and a profile section) may be equalized by varying the thickness of one or both said adhesive layers.

At least two adhesives with different viscosities and/or with different properties in the cured state may be applied two-dimensionally next to each other as a second adhesive layer in the area of the said second joining surfaces.

The following advantageous effects are achieved with the present invention compared with the state of the art:

Compared with prior-art bonding processes, a way has been found for preparing assembly units of rail-borne vehicles by bonding by means of more slowly curing one-component or two-component polyurethane adhesives, in which the technological waiting times until further handling are markedly reduced and the technological floor space requirement and optionally the amount of technological devices needed for this are substantially reduced. Due to the first adhesive layers, which are able to cure rapidly, the components to be joined are fixed in their desired position in relation to one another during joining and such a first bonding strength is reached that immediate further handling of the assembly unit is possible and the joining devices and manufacturing floor space used become free for further assembly units. The property of the first adhesive used according to the present invention, namely, that a defined joining layer thickness is maintained during joining, allows this first adhesive to act as a spacer at the same time. Due to fact that it is applied to selected first bonding surfaces only in a defined layer thickness, larger manufacturing tolerances between the components to be joined can be equalized due to the variable thickness of the second adhesive layer and deviations from the desired shape of the assembly unit can be avoided without difficulty, contrary to the manufacture of such assembly units by welding. At the same time, the risk that the actual layer thickness of the second component will be locally smaller than the minimum layer thickness necessary for optimal strength and the risk that the bonded joints will be filled incompletely due to the components not having been brought sufficiently close to one another are greatly reduced. These risks can be eliminated altogether if the deviations in the shapes of the partners to be joined are measured before joining and the position and/or the layer thickness of the first adhesive is selected corresponding to the result of the measurement.

This process and the use of the adhesives indicated in the exemplary embodiment make it possible in the manufacture of rail-borne vehicles to prepare highly effectively bonded joints in which high elongation at tear and rigidity are combined with a high tolerance to damage and a fatigue strength specific of rail-borne vehicles and the previous complex, stress-transmitting nonpositive and positive-locking connections are equivalent to those needed, e.g., for side wall, front wall and roof sections in the differential design for bodies of rail-borne vehicles, but were hitherto able to be manufactured economically by welding, riveting or screwing only.

A reduction of the joining time can be achieved in a number of applications due to the bonding process according to the present invention compared with joining by means of welding.

This bonding process makes it possible to join components made of different materials into assembly units for bodies of rail-borne vehicles, and differences in the physical behavior (e.g., thermal expansion, elasticity) of the joined components can be equalized by the proper selection of the adhesive.

Compared with the prior-art welding of such assembly units, no deviations in shape due to welding stresses occur during bonding according to the process described, and thermal adjusting operations requiring a high effort are eliminated.

Contrary to the usual welded, riveted or screw connections, joining by bonding does not usually lead to any visual changes on the surfaces of the components or assembly units facing away from the joined surfaces.

Subsequent corrosion protection measures can be carried out much more reliably in bonded connections thus prepared compared with welded assembly units.

The use of this bonding process in rail-borne vehicles makes it possible to manufacture assembly units from components which had already been subjected as blanks or in the course of prefabrication to a special surface treatment (e.g., corrosion protection by galvanization, a decorative lamination with a plastic film or a special protection for the process steps of further processing, e.g., a protective film covering the finished surface of the sheet metal of an outer wall). It is likewise possible to manufacture assembly units in which measures for sound insulation and heat insulation are taken completely already at the stage of the prefabrication (unlike in the case of joining by welding, sparing the areas subjected to thermal stress, which are optionally subjected to an expensive aftertreatment). The process described thus makes possible the manufacture of assembly units that are functionally of a higher quality in conjunction with a higher degree of prefabrication, which saves efforts and costs.

The use of this bonding process substantially increases the freedom of design for shaping the bodies compared with usual welded, riveted or screw connections.

Since the components to be joined by the process according to the present invention may have a design different from that encountered in the case of usual welded, riveted or screw connections, the weight of components and assembly units can be reduced at equal function and strength.

Bonded connections of the type described diminish the generation and above all the transmission of the structure-borne noise, depending on the adhesive used.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 4 is a section through a side wall section in the joined area of a side wall sheet metal section with a reinforcement against buckling.

DESCRIPTION OF THE PREFERRED EMBODIMENT

Figure 1:
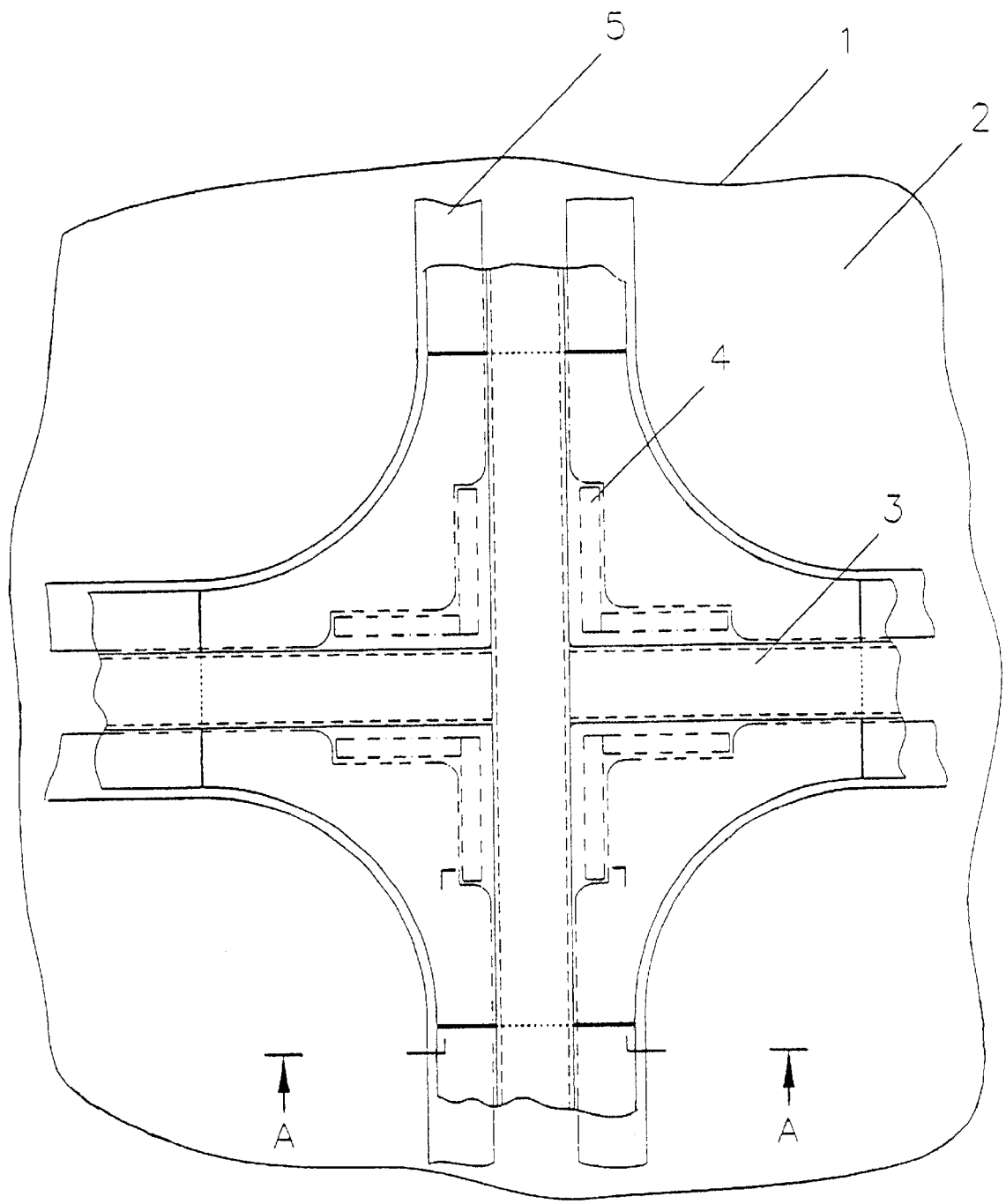
FIG. 1 is a partial view of a side wall section in the joint area of a side wall sheet metal section with a profile section.
Figure 2:
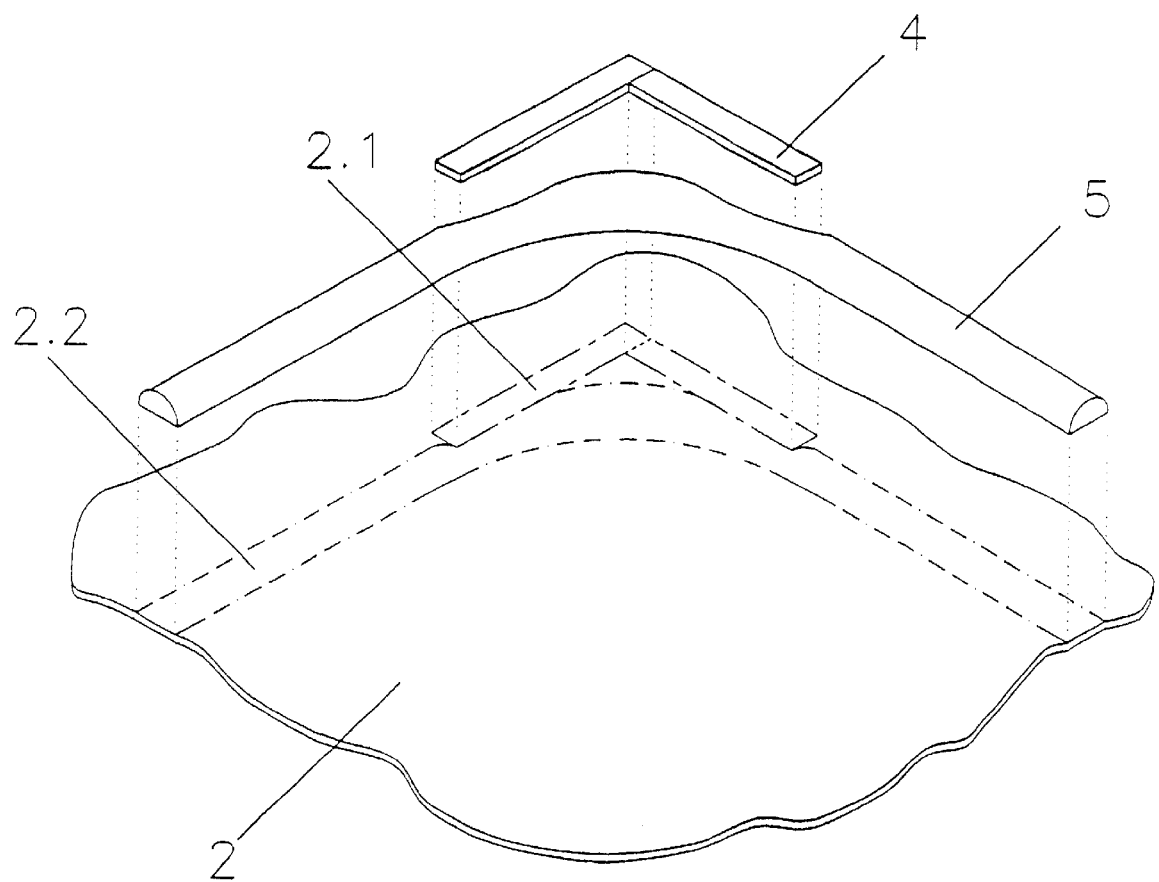
FIG. 2 is a partial view of a side wall sheet metal section according to FIG. 1 with adhesives applied before joining.
Figure 3:
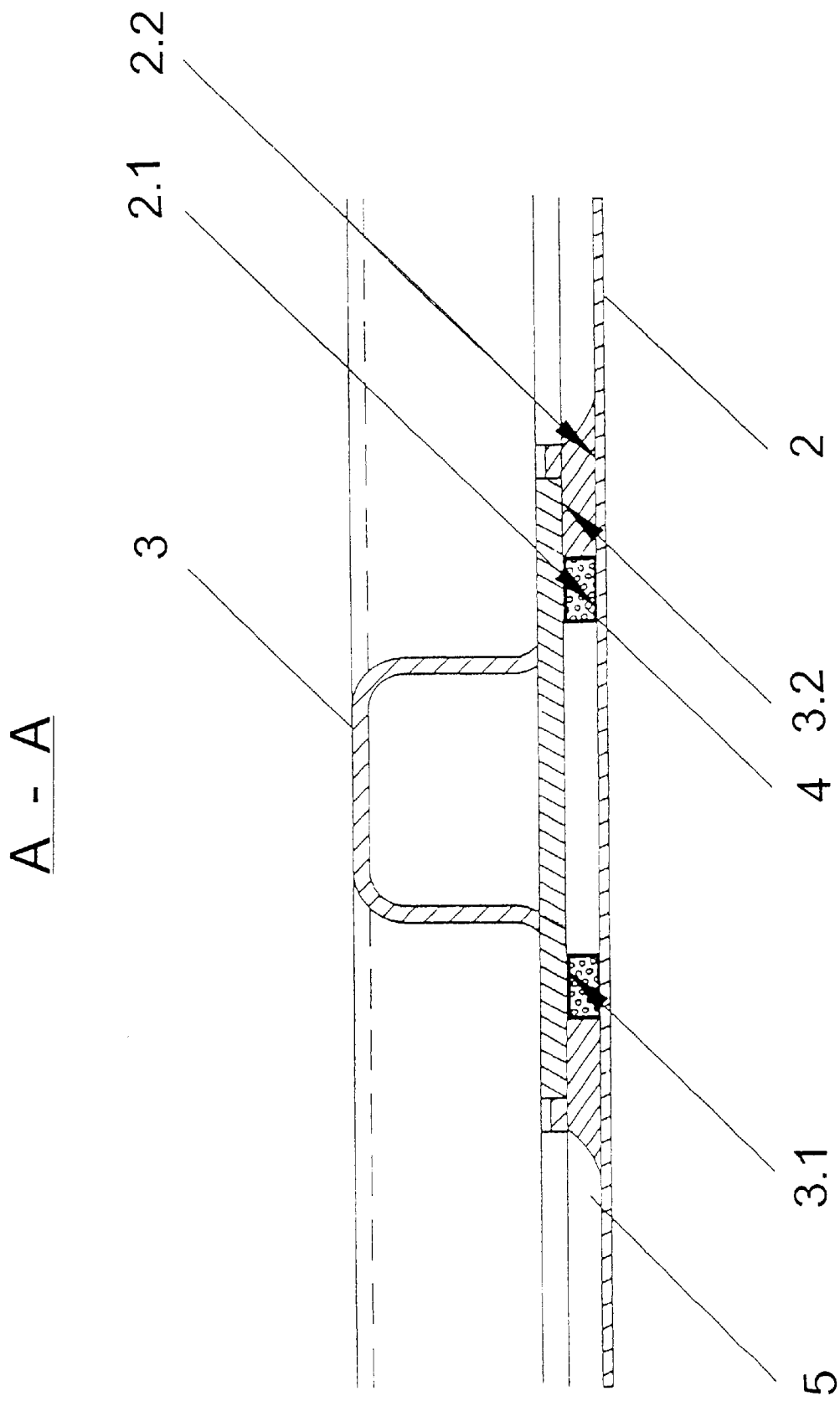
FIG. 3 is a cross section through a bonded joint of the side wall section according to FIG. 1.

The following procedure is followed in the exemplary embodiment in joining the side wall section 1: A prefabricated side wall sheet metal section 2 is brought into a position for joining, by means of a special device if necessary, and fixed in the desired position of use. The first and second joining surfaces 2.1 and 2.2 of the side wall sheet metal section 2 as well as 3.1 and 3.2 of a corresponding profile section 3, whose shape is adapted and is joined in the example from profiles with a hat-shaped cross section and reinforcing gusset plates by welding, are pretreated according to the adhesive manufacturer's instructions for use. As is shown in FIG. 2, one piece each of an adhesive body 4, consisting of a closed-cell acrylate adhesive tape of high adhesive power with a thickness of, e.g., 2 mm, which is contact-adhesive on both sides, is bonded two-dimensionally to the marked first joining surfaces 2.1 of the side wall sheet metal section 2 by a brief contact pressure on the side wall sheet metal section 2, and the adhesive surface of the adhesive body 4 facing away from the joining surface 2.1 still remains covered with the protective film provided by the adhesive manufacturer. As is also shown in FIG. 2, a slowly flowing, but flowable, cold-curing two-component polyurethane adhesive, which is ductile in the cured state, is subsequently applied as a second adhesive layer 5 to the marked second joining surfaces 2.2 of the side wall sheet metal section 2 by means of a prior-art metering, mixing and application device in such an amount and in such a layer thickness that always ensure the wetting of the opposite surface 3.2 and the filling of the bonded joint in the desired manner. Immediately after the application of the adhesive and the removal of the remaining protective film from the adhesive bodies 4, the profile section 3 is brought close to the side wall sheet metal section 2 in the desired three-dimensional arrangement. Under a contact pressure applied briefly in the area of the first joining surfaces 2.1/3.1, the side wall sheet metal section 2 is joined to the profile section 3 (FIG. 1), and a defined joining space is maintained in the area of the first joining surfaces 2.1/3.1 as a consequence of the intrinsic dimensional stability of the adhesive bodies 4. Due to the contact-adhesive adhesive body 4, the side wall section 2 is bonded to the profile section 3 in the area of the first joining surfaces 2.1/3.1 at a joining space predetermined by the defined bonding layer thickness of the adhesive body 4 (FIG. 3). If the number and size of the first joining surfaces 2.1/3.1 are selected properly, such a first bonding strength is reached that removal, moving and possibly further processing of the side wall section may be optionally performed after this joining process without any change in the shape and relative position of the side wall sheet metal section 2 and of the profile section 3 in relation to one another. The assembly unit reaches its final stability and fatigue strength after the curing of the second adhesive layer in the area of the second joining surfaces 2.2/3.3.

As an alternative to this process, it may be expedient to prepare the second adhesive layer 5 only after the components 2 and 3 have already been joined together by means of the first adhesive layer 4 by injecting or drawing the corresponding flowable adhesive into the remaining joint spaces.

Another case of application of a process according to the present invention is the joining of reinforcements against buckling 6 to a side wall sheet metal section 2 (FIG. 4), wherein a slowly flowing one-component polyurethane adhesive, which is viscoplastic in the cured state, is used for the second adhesive layer 5 instead of the slowly flowing, cold-curing two-component polyurethane adhesive described in the above case of application, which is ductile in the cured state.

Adhesive bodies 4, which may remain in place after joining and do not need to be removed and disposed of as special waste at a high expense, may be used as the edge limitation for the second adhesive layer 5 instead of usual covering adhesive tapes.

It has now been found that bonded connections prepared according to one of the processes described have a higher tolerance to damage than bonded connections prepared according to other processes, especially if the first (quick-bonding) adhesive layer has the same elasticity as or a higher elasticity than the second adhesive layer (that ensures the fatigue strength) after the complete curing of this second adhesive. Even though a local overload occurring once or repeatedly in a joined connection causes local damage to the bonded joint in the area of the second adhesive layer, the damage is absorbed in one or both of the adjacent first bonded sites as a consequence of the changed stress level and stress diffusion within the bonded joint prepared according to the present invention, and it does not propagate. This property may be optimized by selecting the ratio of the elasticities of the first and second adhesives. If a joint site is specifically segmented by arranging a plurality of first and second joining surfaces alternatingly adjacent to one another, it is possible to prepare a bonded connection in which a local excessive stress occurring once or repeatedly leads to a partial failure of the bonding connection at best, but not to a complete failure of the bonded connection, because the crack formation originating from a partial area with the second adhesive is stopped in the adjacent partial area of areas with the first adhesive.

Substantially greater manufacturing tolerances of, e.g., the profile section 3 are permissible in the case of the use of this process, and they are equalized in the area of the second joining surfaces in relation to the side wall sheet metal section 2, as in the case of the joining process by welding, without such deviations in shape becoming visible in the outer wall of the side wall section 1.

To obtain greater joining spaces and to equalize different joining spaces in the area of the first joining surfaces as well, the adhesive bodies for the first adhesive layer may be made of a plurality of layers of the said adhesive tape.

Instead of the two-sided contact-adhesive acrylate adhesive, it is also possible to use another first adhesive material, in which one quick-bonding adhesive layer each is applied, e.g., to both sides of a filler core having intrinsic dimensional stability.

To equalize differences in the shape and dimension of the components, it may be expedient to use more than one adhesive with different viscosity and/or with different strength properties in the cured state for greatly different bonded joint gaps and widths in the area of the second joining surfaces.

In certain cases of application, the process according to the present invention may also be carried out with other reactive adhesives, especially epoxy resin adhesives, instead of the polyurethane adhesives used for the second adhesive layer in the exemplary embodiment.

The processes described may be used not only to manufacture assembly units of differential design for a body of a rail-borne vehicle. They may also be used equally, e.g., for fastening an assembly unit on or at the load-bearing section as well as for manufacturing entire bodies from large sections, which are joined by means of bonded connections prepared according to the processes described in two-dimensionally overlapping or two-dimensionally abutting areas.

Application in other technical areas is possible.

While specific embodiments of the invention have been shown and described in detail to illustrate the application of the principles of the invention, it will be understood that the invention may be embodied otherwise without departing from such principles.

What is claimed is:

1. A process for joining components of rail-borne vehicles by bonding including joining a preformed first component to a shape-adapted second component by means of the two-dimensionally separate application of adhesives with different reaction characteristics until a strength sufficient for handling is reached wherein the first component is brought into the position for joining and fixed in the form of use in the usual manner, the process comprising the steps of:

applying an adhesive body having the property of being quick-bonding and maintaining a defined joining layer thickness to a selected and two-dimensionally limited first joining surface of the first component and/or of the second component;

applying a defined amount of an adhesive layer having the property of curing more slowly and flowing slowly during joining, but being flowable and capable of wetting, to selected second joining surfaces of the first component and/or of the second component;

positioning the two components to be joined in a desired three-dimensional arrangement in relation to one another and bringing the two components close to one another and joining the two components to one another under the effect of a joining pressure applied in the area of the selected first joining surface, wherein the adhesive body connects the first component to the second component in the area of the first joining surface at a joining space predetermined by the defined joining layer thickness of the adhesive body with such a first joining strength that removal and moving of a pre-joined assembly unit is possible after the joining process without any change in the shape and position of the components, and the adhesive layer, whose amount as well as flowability and wetting ability are such that the adhesive body applied can contact the other component in the area of the joining surfaces, fills out the joining space left between the first and second components in the area of the second joining surfaces;

providing the assembly unit subsequently in the joined position or in a resting position or included in a further technological process, where a second joining strength brought about by the curing of the adhesive layer is reached.

2. The process in accordance with claim 1, wherein said first joining surface provided is selected such that at least part of said second joining surfaces provided is limited by parts of said adhesive body and undesired wetting of additional surfaces of the component by the adhesive of said adhesive layer is prevented.

3. The process in accordance with claim 2, wherein the adhesive body comprises a contact-adhesive.

4. The process in accordance with claim 1, wherein the adhesive body comprises a contact-adhesive.

5. The process in accordance with claim 1, wherein a reactive adhesive is used for said second adhesive layer.

6. The process in accordance with claim 1, wherein an adhesive that has the same elasticity as or a higher elasticity than the adhesive for the second adhesive layer after the final curing of the second adhesive layer is used for the first adhesive layer.

7. The process in accordance with claim 6, wherein a plurality of first and second joining surfaces are arranged alternatingly adjacent to one another in a joined connection such that the joined connection acquires increased safety against failure.

8. The process in accordance with claim 1, wherein differences in the shape and size of the components to be joined are equalized by varying the thickness of one or more of the adhesive body and the adhesive layer.

9. The process in accordance with claim 1, wherein at least two adhesives with different viscosities and/or with different properties in the cured state are applied two-dimensionally next to each other as the second adhesive layer in the area of the second joining surfaces.

10. A process for joining components of rail-borne vehicles by bonding, in which a preformed first component is joined to a shape-adapted second component by means of the two-dimensionally separate application of adhesives possessing different reaction properties to reach a strength sufficient for handling, the process comprising the steps of:

bringing the first component into the position for joining and fixing in the form of use;

applying an adhesive body having the property of being quick-bonding and maintaining a defined joining layer thickness during joining to a selected and two-dimensionally limited first joining surface of the first component and/or of the second component;

positioning the components to be joined in the desired three-dimensional arrangement in relation to one another;

bringing the components to be joined close to one another;

joining the components to be joined together under the effect of a joining pressure applied in the area of the selected first joining surface, wherein said adhesive body connects the first component to the second component in the area of the first joining surface at a joining space predetermined by the defined joining layer thickness oft he adhesive body with such a first joining strength that removal and moving oft he pre-joined assembly unit is possible without any change in the shape and position of the components in relation to one another;

introducing a defined amount of an adhesive layer having the required flowability and wetting ability into the joining space left between the first and second components in the area of selected second joining surfaces; and providing the assembly unit subsequently in its joined position or bringing the assembly unit into a resting position or the assembly unit is included in a further technological process, where a second joining strength brought about by the curing of the adhesive layer is reached.

11. The process in accordance with claim 10, wherein said first joining surface provided is selected such that at least part of said second joining surfaces provided is limited by parts of said adhesive body and undesired wetting of additional surfaces of the component by the adhesive of said adhesive layer is prevented.

12. The process in accordance with claim 11, wherein the adhesive body comprises a contact-adhesive.

13. The process in accordance with claim 10, wherein the adhesive body comprises a contact-adhesive.

14. The process in accordance with claim 10, wherein a reactive adhesive is used for said second adhesive layer.

15. The process in accordance with claim 10, wherein an adhesive that has the same elasticity as or a higher elasticity than the adhesive for the adhesive layer after the final curing of the adhesive layer is used for the adhesive body.

16. The process in accordance with claim 15, wherein a plurality of first and second joining surfaces are arranged alternatingly adjacent to one another in a joined connection such that the joined connection acquires increased safety against failure.

17. The process in accordance with claim 10, wherein differences in the shape and size of the components to be joined are equalized by varying the thickness of one or more of the adhesive body and adhesive layer.

18. The process in accordance with claim 10, wherein at least two adhesives with different viscosities and/or with different properties in the cured state are applied two-dimensionally next to each other as the second adhesive layer in the area of the second joining surfaces.

\* \* \* \* \*